United States Patent [19]

Ackeret

[11] 4,119,162
[45] Oct. 10, 1978

[54] KITCHEN OR HOUSEHOLD WEIGHING BALANCE

[75] Inventor: Peter Ackeret, Kusnacht, Switzerland

[73] Assignee: Salter Housewares, Limited, West Bromich, England

[21] Appl. No.: 750,883

[22] Filed: Dec. 15, 1976

[30] Foreign Application Priority Data

Dec. 16, 1975 [GB] United Kingdom .............. 51376/75
Dec. 16, 1975 [GB] United Kingdom .............. 51377/75

[51] Int. Cl.² ..................... G01G 3/08; G01G 23/14
[52] U.S. Cl. ................................. 177/229; 177/174
[58] Field of Search ............... 177/174, 229, 245, 173

[56] References Cited

U.S. PATENT DOCUMENTS

| | | | |
|---|---|---|---|
| 1,638,260 | 8/1927 | Hansen | 177/174 |
| 2,821,376 | 1/1958 | Aston | 177/229 X |
| 3,047,084 | 7/1962 | Vogel | 177/229 |
| 3,831,688 | 8/1974 | Phipps | 177/229 |
| 3,894,591 | 7/1975 | Ackeret | 177/245 X |

FOREIGN PATENT DOCUMENTS 1,387,626  3/1975  United Kingdom ................... 177/229

*Primary Examiner*—George H. Miller, Jr.
*Attorney, Agent, or Firm*—Neil F. Markva

[57] ABSTRACT

A kitchen weighing balance has a scale carrier, rotatably adjustable about a vertical axis, which provides a dial face having therein a plurality of graduated scales for co-acting with an angularly movable weight indicator pointer visible through a transparent window. At least some of the graduated scales are grouped in radially spaced relationship in different angular segments of the dial face and are calibrated in weight equivalent calorie units or standard bulk volume units for different pre-selected groups of foodstuffs, and they can be selectively brought into co-acting relationship with the pointer, throughout the operative range of pointer deflection, by positional adjustment of the scale carrier. The scale carrier is a circular ring mounted on a circular base frame of the balance casing which protrudes radially with respect to an upstanding central tubular portion enclosing the weighing mechanism. A transparent circular cover member overlying the base frame provides the window and is spaced from the base frame by a circumferential gap giving access to the scale carrier for digital manipulation. The weighing mechanism includes a parallel motion leaf spring unit which co-acts with an intermediate lever member pivoted about a horizontal axis and having laterally directed integral gear teeth which mesh directly with a gear pinion driving the pointer about a vertical axis, the lever member being carried by a pre-set displaceable mounting block.

10 Claims, 9 Drawing Figures

KITCHEN OR HOUSEHOLD WEIGHING BALANCE

BACKGROUND OF THE INVENTION

This invention relates to weighing balances, particularly for kitchen or household use.

One object of the present invention is to provide a weighing balance of the above-mentioned kind which is adapted specifically for weighing food in terms of "calorie" units or "bulk volume" units. In general, foodstuffs can be divided or classified into different groups, those in each group all having similar calorific values per unit weight or having similar bulk volume per unit weight.

A further object is to provide an improved spring weighing mechanism for such weighing balances.

SUMMARY OF THE INVENTION

According to one aspect of the present invention, a weighing balance has weight indicator means comprising a movable indicating point which co-acts with graduated scale means on a dial face of a scale carrier member. The pointer is operatively controlled by the weighing mechanism of the balance so as to be displaced from an initial zero applied load position to an extent substantially proportional to the load applied to the balance throughout the operational weighing range thereof. The graduated scale means comprises a plurality of different graduated scales extending in circular arcs covering different angular segments of said dial face. The scale carrier member is rotatably adjustable so as to enable the dial face to be moved and set to bring the different graduated scales in said different angular segments selectively into an operative position to co-act with the indicating pointer. The range of adjustable movement of the scale carrier member is at least sufficient to enable a zero marking of each graduated scale to be brought selectively into a position coincident with said initial zero applied load position of the pointer. The range is also sufficient to enable said zero marking of each graduated scale to be selectively advanced from the position coincident with the zero applied load position of the pointer up to a position adjacent or coincident with the position of the pointer when deflected by an applied load equal to the load corresponding to the maximum graduation reading of said respective graduated scale. Thus, any one of the graduated scales can be selected for use in co-acting with the pointer. Furthermore when using any selected graduated scale, re-zeroing adjustments can be made by rotating the scale carrier member to facilitate measurement of successively added loads throughout substantially the full operational weighing range appertaining to the particular said graduated scale in use. At least one of said different graduated scales is a "weight" scale calibrated in units of weight and other said different graduated scales in different said angular segments are each calibrated in weight equivalent units for a given group of foodstuffs having similar equivalent values.

The weighing equivalent units for each different scale may be weight equivalent calorie units for a different given group of foodstuffs having similar calorific values; or they may be weight equivalent "volume" units, e.g. standard measures such as "cups" and "spoons", for a different given group of foodstuffs having similar density values, herein termed "standard volume" scales.

At least one of the graduated scales may cover an angular segment of the dial face within a range of 150° to 180°, and also, in preferred embodiments, the scale carrier member may be rotatably adjustable through an angle of 360°.

It will be understood that the term "angular segment" is used herein to denote an area of the dial face bounded by a pair of angularly disposed radii, and in a full circular disc dial face would be equivalent to a sector thereof.

The facilitation of additive weighing, that is, the measurement of successively added loads, by means of the re-zeroing adjustment feature of the scale carrier member is particularly useful in preparing calorie controlled diets because it is frequently necessary to weigh and ascertain the weight equivalent calorific value of each of a number of different foodstuff ingredients when carrying out such preparative work.

If there is not a "calorie" scale covering the foodstuff group which includes a particular foodstuff being weighed, the "weight" scale may be used and the calorific value would then be computed separately, by consulting published tables for example, from the actual weight reading obtained. But, for maximum convenience, the dial face of the scale carrier member should be provided with a plurality of "calorie" scales covering as many different foodstuff groups as possible. These different "calorie" scales may be arranged not only in different angular segments of the dial face but also as a group, in concentric radially-spaced relationship, lying within one angular segment or in each of a number of different angular segments of the dial face, thereby to assist in solving the problem of providing a sufficiently large number of different "calorie" scales to meet practical requirements upon a single dial face of a weighing balance of compact design.

Similar considerations apply to providing a plurality of "standard volume" scales.

The different graduated scales may be readily identified and distinguished one from another by using any desired visual coding means, such as coding symbols and/or colons.

The weighing balance of weighing apparatus in accordance with the invention may also include various structural features which can be useful, for example, in facilitating assembly during manufacture and in providing for a wide range of angular adjustment of the scale carrier member and convenient manipulation thereof.

In one advantageous form of construction, a circular or annular portion of the body structure or casing of the weighing balance extends around and below a central tubular portion surmounted by a telescopically movable weighing platform structure. The circular portion comprises a base frame of circular peripheral contour and an overlying separate cover member, also of circular peripheral contour. The cover member provides a transparent window through which the pointer, pivotally mounted to turn about a central vertical axis, is exposed to downwards viewing when the balance is in use. With this form of construction, the scale carrier member, in the form of a circular ring horizontally disposed in co-axial relationship with the pointer, is mounted upon said base frame. The peripheral portion of said scale carrier member fits with working clearance within a circumferential gap between opposed spaced-apart peripheral portions of the base frame and cover member which lie in mutually confronting relationship. The peripheral portion of the scale carrier member carries or is formed with digitally engageable means exposed outside the body structure or casing in order to facilitate the manual manipulation and adjustment of said scale carrier member. The digitally engageable means may comprise at least one radially protruding grip or handle element carried by the scale carrier member.

In the above construction, conveniently the central tubular portion, in the form of a housing or boss, is a separate part which is detachably fixed to the base frame and which locates the cover member. The cover member may be a one-piece molding of transparent plastics material, and may have a truncated shallow substantially conical configuration.

The weighing mechanism preferably comprises a leaf spring parallel motion unit mounted on the base frame. The balance includes "up stop" means to limit upwards movement of the leaf springs as a precaution against possible damage to the mechanism. The spring balance weighing mechanism is such that movement is transmitted from the parallel motion leaf spring unit to a movable weight indicator, which deflects angularly in a horizontal plane, by an intermediate lever member mounted so as to turn in a vertical plane. The intermediate lever member includes integral gear teeth which mesh directly with a gear pinion connection to the movable weight indicator for driving the latter. Means are preferably also included for facilitating initial adjustment and centering of a pivoted pointer type indicator.

BRIEF DESCRIPTION OF DRAWINGS

One form of weighing balance, together with a bowl type weighing container, which represents one practical embodiment of the invention is illustrated, by way of example only, in the accompanying drawings.

In said drawings.

DESCRIPTION OF SPECIFIC EMBODIMENTS

Figure 1:
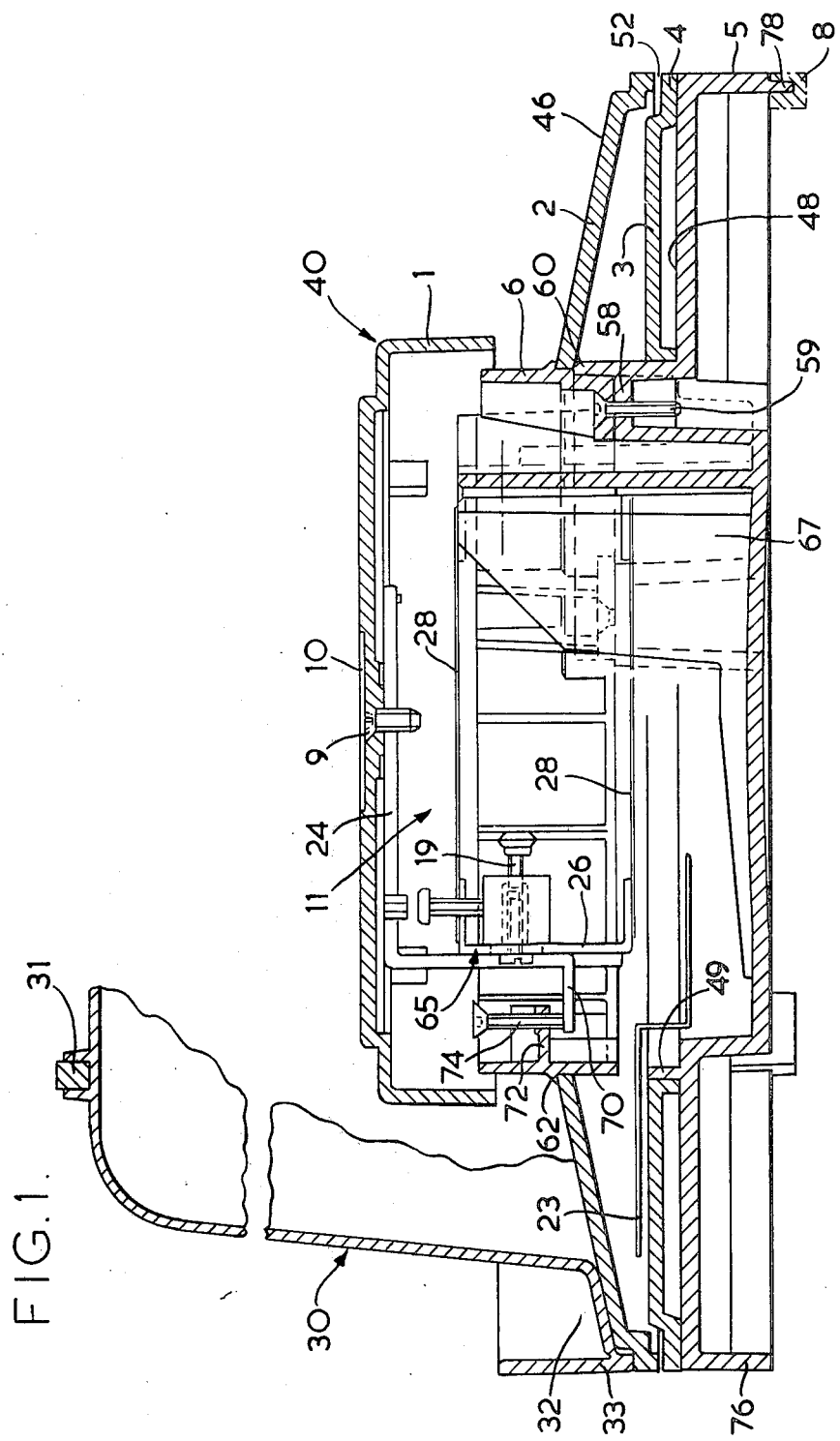
FIG. 1 is a vertical cross-sectional view through the weighing balance and, in fragmentary form, through the weighing container shown in its inverted out-of-use condition.
Figure 2:
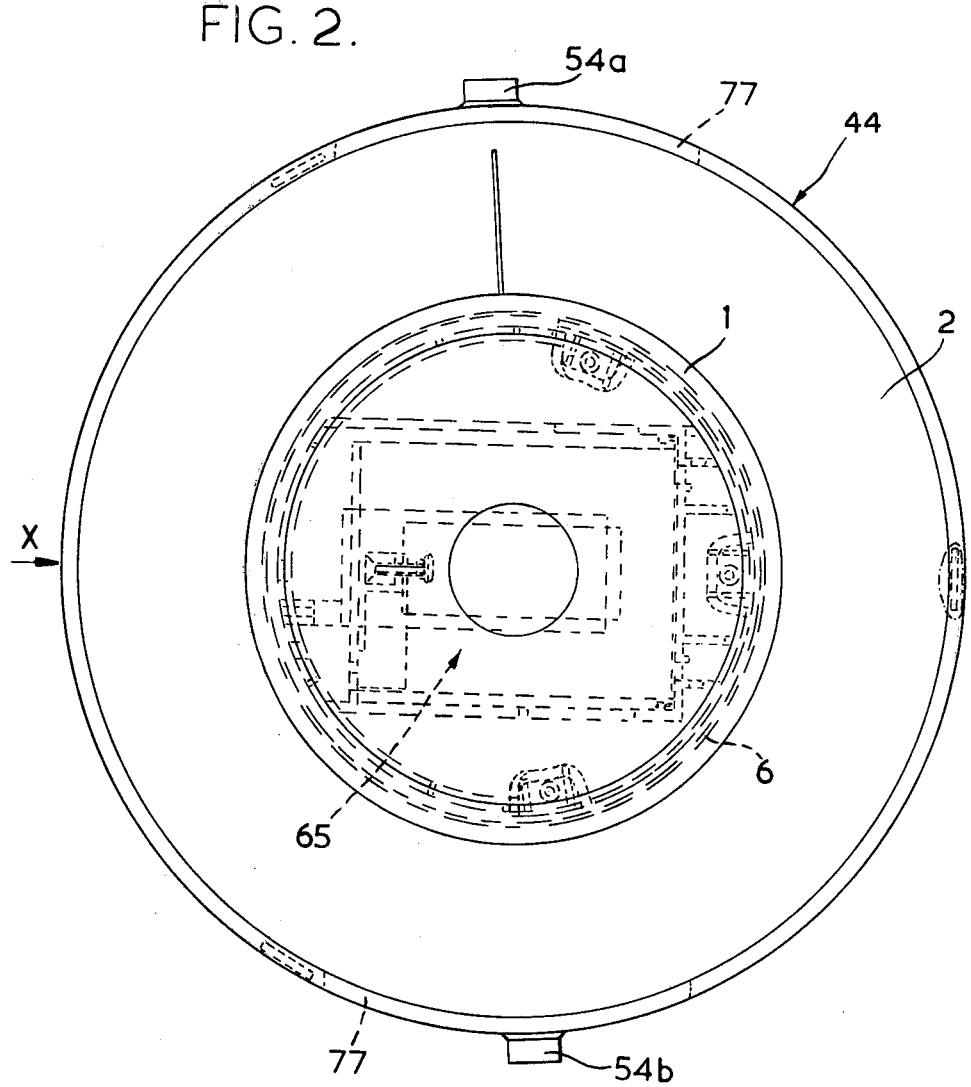
FIG. 2 is a top plan view, on a somewhat smaller scale, of the weighing balance, with the graduated scales and markings of the dial face of a scale carrier member component omitted.
Figure 3:
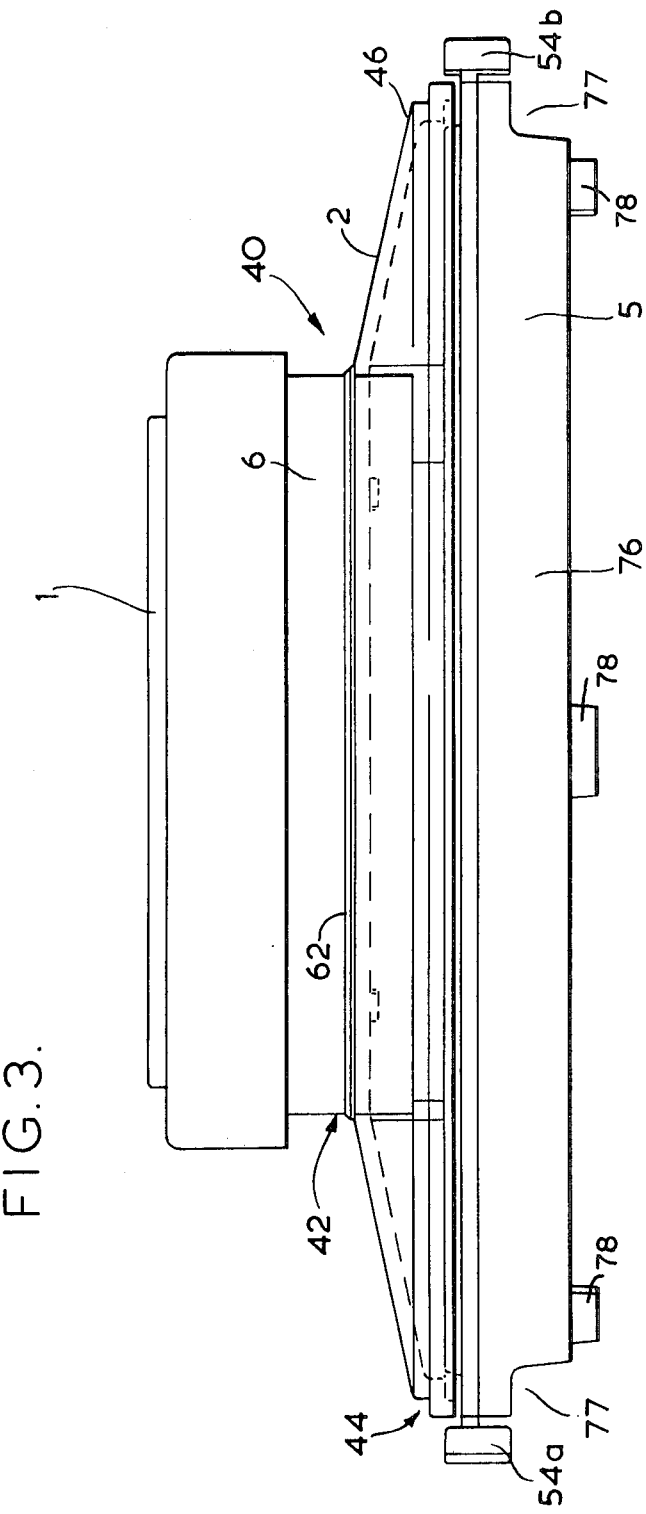
FIG. 3 is a side elevational view of the weighing balance in the direction of the arrow X shown in FIG. 2.

Referring to the drawings, the weighing apparatus illustrated therein comprises a weighing container in the form of a deep cut shaped circular bowl 30 and a weighing balance 40 having a body structure or casing 42 enclosing weighing mechanism 11.

The body structure or casing 42 comprises a circular or annular lower portion 44 and, upstanding therefrom, a cylindrical central portion in the form of a tubular housing or boss 6 over the upper end of which is fitted a hook-like weighing platform structure 1 adapted for telescopic up and down vertical movement.

The circular or annular lower portion 44 protrudes radially with respect to the central tubular housing or boss 6 and is made up of a shallow cylindrical base frame 5 and an overlying separate cover member 2, molded of transparent plastics material, which has a truncated shallow substantially conical configuration.

The cover member 2 thus forms an upwardly presented transparent window which exposes to downwards viewing a dial face 3 of a graduated scale carrier member 4 and the outer end portion of a complementary indicating pointer 23 which together provide the weight indicator means of the balance.

The lower portion 44 of the body structure or casing of the balance also provides a seating which supports the bowl 30, by engagement with a rim portion thereof, when the bowl is fitted in an inverted out-of-use condition over the balance so as to serve as a cover, as indicated in FIG. 1. The seating is formed by the upper surface of the outer peripheral portion 46 of the cover member 2 which has a stepped configuration adapted to interengage and locate with the rim portion 32 of the bowl 30 which rests thereon. As shown, the rim portion 32 has a deep peripheral flange 33, spaced from the main wall of the body of the bowl, which provides a wide U-shaped channel profile and which protrudes so as to interlock with the stepped configuration of the seating 46 thereby to restrict lateral displacement of the inverted bowl.

In use, the bowl 30 is, of course, utilized in an upright condition and, during weighing, stands upon the top of the weighing platform structure 1. The base of the bowl is fitted with a rubber ring 31 to improve stability and non-slip characteristics when in its upright condition.

The scale carrier member 4 is in the form of a horizontally disposed flat circular ring, of which the uppermost surface constitutes the dial face 3, co-axially arranged and rotatably mounted upon a flat horizontal surface 48 of the base frame 5 beneath the transparent cover member 2. The base frame 5 includes an integral upstanding circular flange 49 which locates the ring of the scale carrier member 4 and forms a hub bearing about which it turns.

The pointer 23 is mounted so as to turn, in a horizontal plane, about a central vertical pivotal axis and is operatively controlled by the weighing mechanism, as hereinafter more fully explained, so as to deflect angularly, from an initial zero applied load position, to an angular extent substantially proportional to the load applied to the balance throughout the operational weighing range thereof which, in this embodiment, corresponds to a pointer deflection of substantially 180°. For clarity, the pivot mounting of the pointer 23 and part of the weighing mechanism connected thereto has been omitted in FIG. 1, but as shown the horizontally extending outer end portion of the pointer 23 lies closely above the dial face 3 of the scale carrier member 4.

Figure 4:
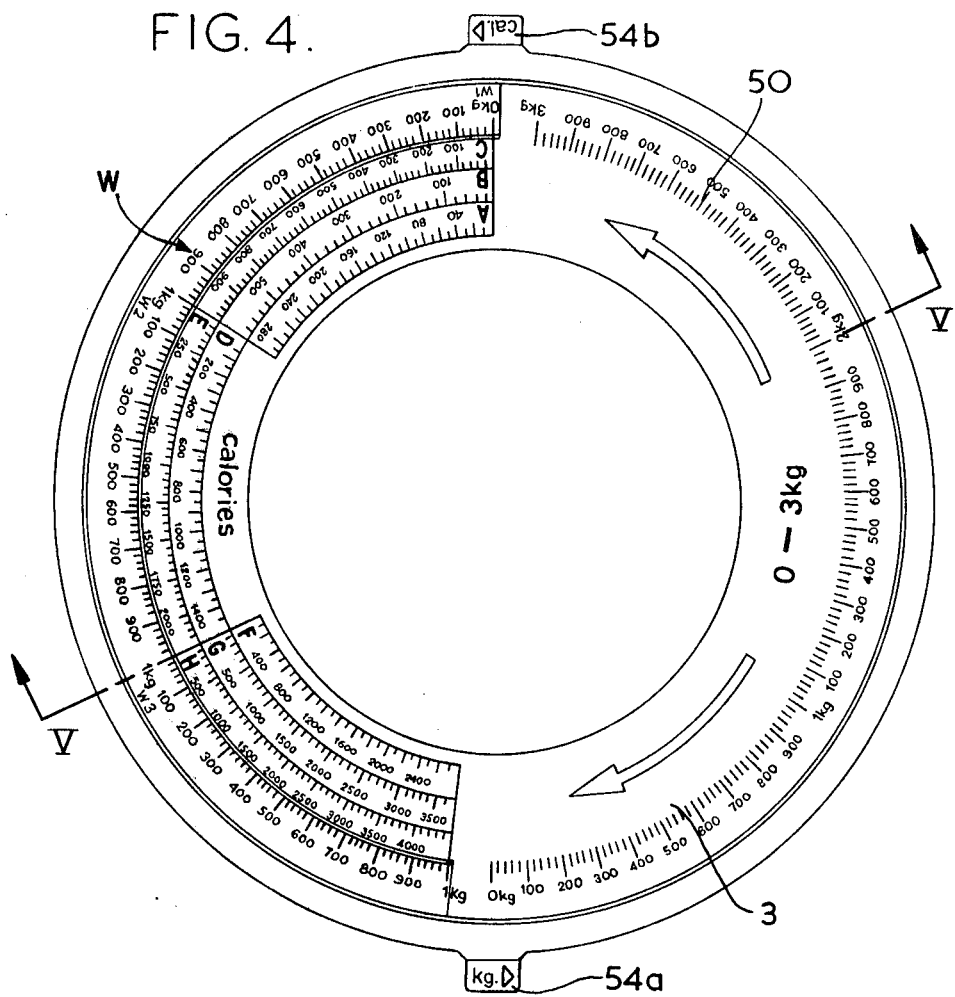
FIG. 4 is a plan view of the dial face provided by the scale carrier member component.
Figure 5:
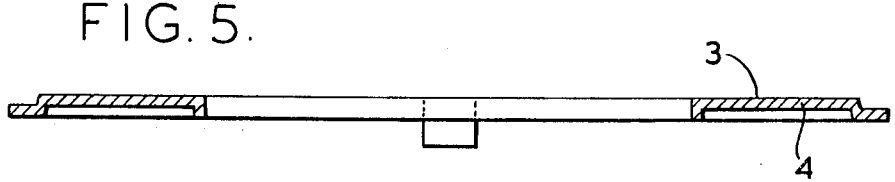
FIG. 5 is a sectional view of the scale carrier member taken on line V—V of FIG. 4.

As best seen in FIG. 4, on the dial face 3 the scale carrier member 4 carries a plurality of different graduated scales extending in concentric circular arcs for co-operating with the pointer 23. One of these graduated scales, indicated by the reference W, is calibrated solely in units of weight. In this example, this "weight" scale W has a weight range of 0 to 3 kilograms and it covers an angular segment of the dial face ranging through an angle which is only slightly less than 180°.

The other graduated scales, indicated by references A to H and W1, W2, W3, are all arranged in three different adjacent smaller angular segments, each of slightly less than 60° angular range, which together cover most of the opposite remaining portion of the dial face 3. Each of these smaller angular segments contains three or four of the different graduated scales arranged as a set in concentric radially spaced relationship. As shown, the radially outermost scale W1, W2, or W3, in each such set is again calibrated in units of weight ranging from 0 to 1 kilogram, but the other scales therein form a group of "calorie" scales each calibrated in weight equivalent calorie units for a particular group of foodstuffs. All the "calorie" scales, both those in the same angular segment and those in different angular segments, differ from one another, each covering a different particular foodstuff group, and they are distinguished and identified by the series of individual alphabetical references or code letters A to H.

Thus, with this arrangement, it is possible to display on a single dial face not only a "weight" scale covering an extensive direct weighing range up to 3 kilograms unencumbered by any other closely adjacent calibrations, but also a series of "calorie" scales covering eight different groups of foodstuffs and having each a weight range of one kilogram which is frequently quite sufficient in practice when preparing mixed diets. This arrangement can, however, readily be modified to include an even greater number of "calorie" scales, if desired.

The peripheral portion of the scale carrier member or ring 4 fits with working clearance within a circumferential gap 52 between the undersurface of the outer peripheral portion 46 of the cover member and the opposed uppermost surface of the peripheral portion of the base frame 5 which lies in confronting relationship therewith.

To facilitate manual manipulation and rotatable adjustment of the scale carrier member 4 it is provided with a pair of integral diametrically opposed radially protruding finger grip or handle projections 54a, 54b, which are exposed outside body structure or casing, and in this embodiment the scale carrier member can be rotated through a full 360°.

In use, before a load is applied to the balance, while the pointer 23 is in its initial zero load position, the scale carrier member 4 is rotated using one or another of the projections 54a, 54b, so as to bring into a position of coincidence with the pointer the zero marking of whichever graduated scale it is desired to use. After then weighing out in the weighing container bowl 30 a quantity of a first foodstuff material, either according to its actual weight value or according to its total calorific value as ascertained by using the appropriate "calorie" scale, a quantity of a second different foodstuff material can be added and weighed successively after turning the scale carrier member to carry out a re-zeroing operation. Again, in re-zeroing, the zero marking of whichever graduated scale it is desired to use for the second ingredient, whether it be the main "weight" scale 50 or a "calorie" scale in an angular segment the same as, or different from, that of the graduated scale first used, is brought into a position coincident with the pointer in the position to which the pointer is deflected by the load of the first foodstuff ingredient.

The above additive weighing sequence can clearly be repeated as many times as required, within the operational weighing range of the balance. The latter may conveniently be indicated by a suitable permanent marking or a non-adjustable additional "weight" scale on the transparent cover member, or on another part of the lower portion of the body structure or casing, showing the position of maximum permissible angular deflection of the pointer.

If the total quantity of a particular foodstuff to be weighed out according to its total calorific value is greater than one kilogram so that it exceeds the range of an appropriate "calorie" scale, it will be seen that the foodstuff can be weighed out in two or more stages, using a quantity in each stage which does not exceed one kilogram and using the re-zeroing facility between successive stages. In general, with the graduated scale arrangement and layout shown and with the re-zeroing adjustment feature of the scale carrier member, the user is presented with a very versatile choice sufficient to cover a wide range of domestic food weighing requirements in a highly convenient manner.

The central tubular housing or boss 6 is a separate part which is supported upon a number of circumferentially spaced integral seating portions 58 of the base frame 5 to which it is detachably fixed by screws 59. It also serves to locate the transparent cover member 2 which rests on the top of an upstanding part-circular extension 60 of the flange 49 of the base frame 5, a shallow bevelled circular rib 62 around the outer cylindrical surface of the housing or boss 6 abutting the top edge of the cover member 2 as shown in FIG. 1.

This manner of construction facilitates assembly of the balance.

The weighing mechanism 11 comprises a parallel motion leaf spring unit 65 which is made up of upper and lower spaced-apart parallel leaf springs 28, 28, extending horizontally between interconnecting front and rear frame members, 26 and 29 respectively, which are formed as U-shaped metal pressings.

The rear frame member 29 locates within slots 80 of an upstanding fixed pillar support 67 forming an integral part of a base frame 5 of the balance casing 42, and this frame member 29 is rigidly mounted upon and secured to said pillar support 67 by fixing screws 22.

The front frame member 29 is rigidly secured, by locating studs 82 and fixing screw 27, to a carrier plate bracket 24 of inverted "L" shape, which is attached to the underside of, and supports, the weighing platform 1 of the balance. Thus, in response to loads applied to the weighing platform, the leaf springs 28, 28 flex so that the front frame member 26 moves up and down vertically together with the weighing platform.

Through an intermediate lever member 15, the vertical movement of the front frame member 26 controls angular deflection in a horizontal plane of a pivoted indicating pointer 23, of which the outer end portion co-operates with a graduated scale extending through a circular arc on a horizontally disposed flat scale carrier ring 4 rotatably mounted in the balance casing.

The pointer 23 is in the form of a wire finger and the inner end portion is fashioned into a loop of substantially rectangular configuration which clips into a groove formation 85 around a rectangular section carrier block portion 86 formed by an integral axial extension or boss of a gear pinion 14.

Figure 7:
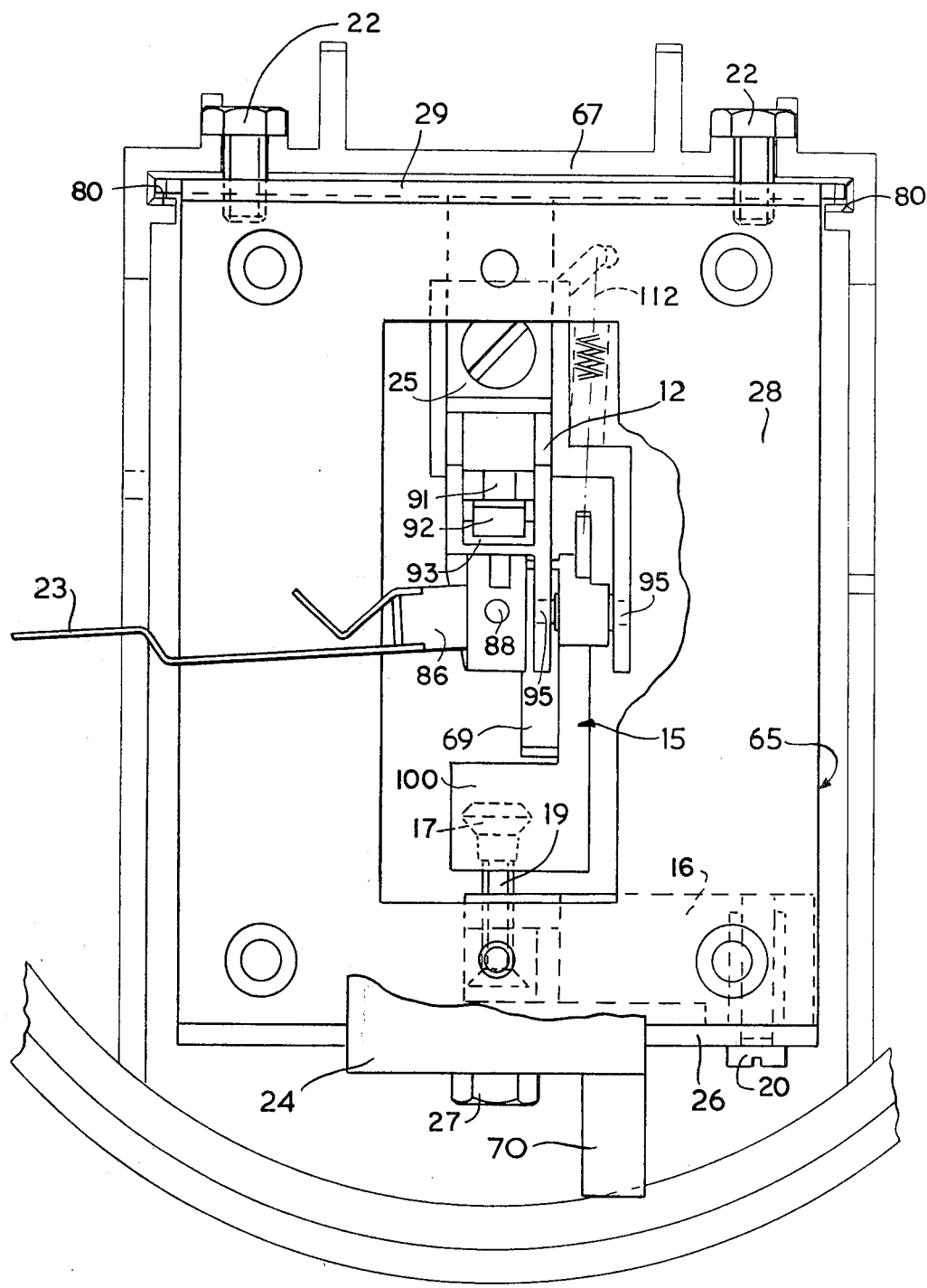
FIG. 7 is a top plan view, with part broken away, of the weighing mechanism shown in FIG. 6.
Figure 8:
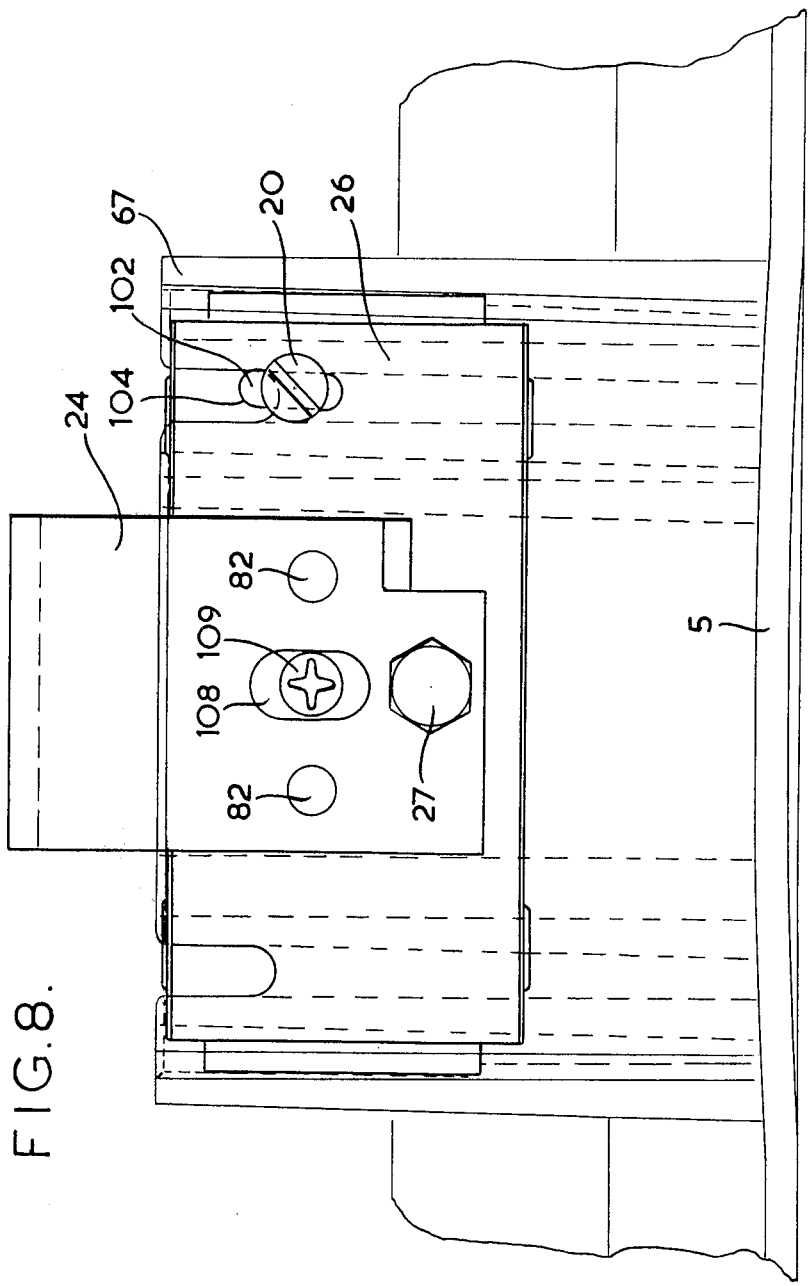
FIG. 8 is a front elevational view of the weighing mechanism.

The gear pinion 14 is supported, for rotation about a central vertical axis, by top and bottom bearing mountings 88 and 89 which are carried by a fixed mounting block 12. The top pinion bearing mounting 88 is provided by an apertured horizontally projecting lug which is integrally formed with the main hollow box-like body of the mounting block 12, but the bottom pinion mounting 89 is provided by a lower horizontal limb of a separate L-shaped bracket part 13 which clips into located position in the main body of the mounting block 12. These components are molded in plastics material and the top portion of the vertical limb of the bracket part 13 fits into slots 90 and enters the interior recess 91 of the block 12 wherein it is retained by snap engagement of a lip portion 92 with a shoulder 93 within said mounting block recess (see FIG. 7). Thereby, fitting of the pinion 14 during assembly is carried out very readily without requiring any special assembly tools.

The lever member 15 is also carried by the mounting block 12 and is mounted thereon by trunnions 95, 95, for rotation in a vertical plane about a horizontal pivotal axis which lies in intersecting relationship with the vertical pivotal axis of the pinion. The lever member 15 is also a plastics molding which has a bell crank or quadrant form with two arms 97, 98, extending at right angles to one another. The one arm 97, which projects downwards, is provided with an arcuate set of contrate gear teeth 69 and forms a sector gear meshing with the gear teeth of the pinion 14. The other arm 98, termed the operating arm, projects forwardly in a substantially horizontal direction in operational use and abuttingly engages, through an integral laterally protruding plate-like lug 100, the capped inner end of an abutment screw 19 fitted in a cantilever arm member 16 carried by the front frame member 26 of the leaf spring unit 65.

The cantilever arm member 16 is provided by an elongate body, again of molded plastics material, which extends transversely behind the front frame member 26 and which is rigidly fixed to the latter at one side by a fixing screw 20 and an integral locating stud 102 of oval form that fits closely in a slot 104 of similar profile in the body of said frame member 26.

The screw 19 is fitted towards the free end of the cantilever arm member 16 and extends substantially horizontally within the path of vertical movement of the lug 100 of the lever member 15. It can be adjusted axially by a tool engaged with its slotted head 109 which is accessible through an aperture 108 in front frame member 26, and its contact point with the lever operating arm 98 can thereby be moved towards or away from the pivotal axis of the lever member 15 so as to vary the lever ratio and provide a "range" adjustment. As shown, a plastic cap 17 is fitted on the inner contact end of the screw 19.

Figure 6:
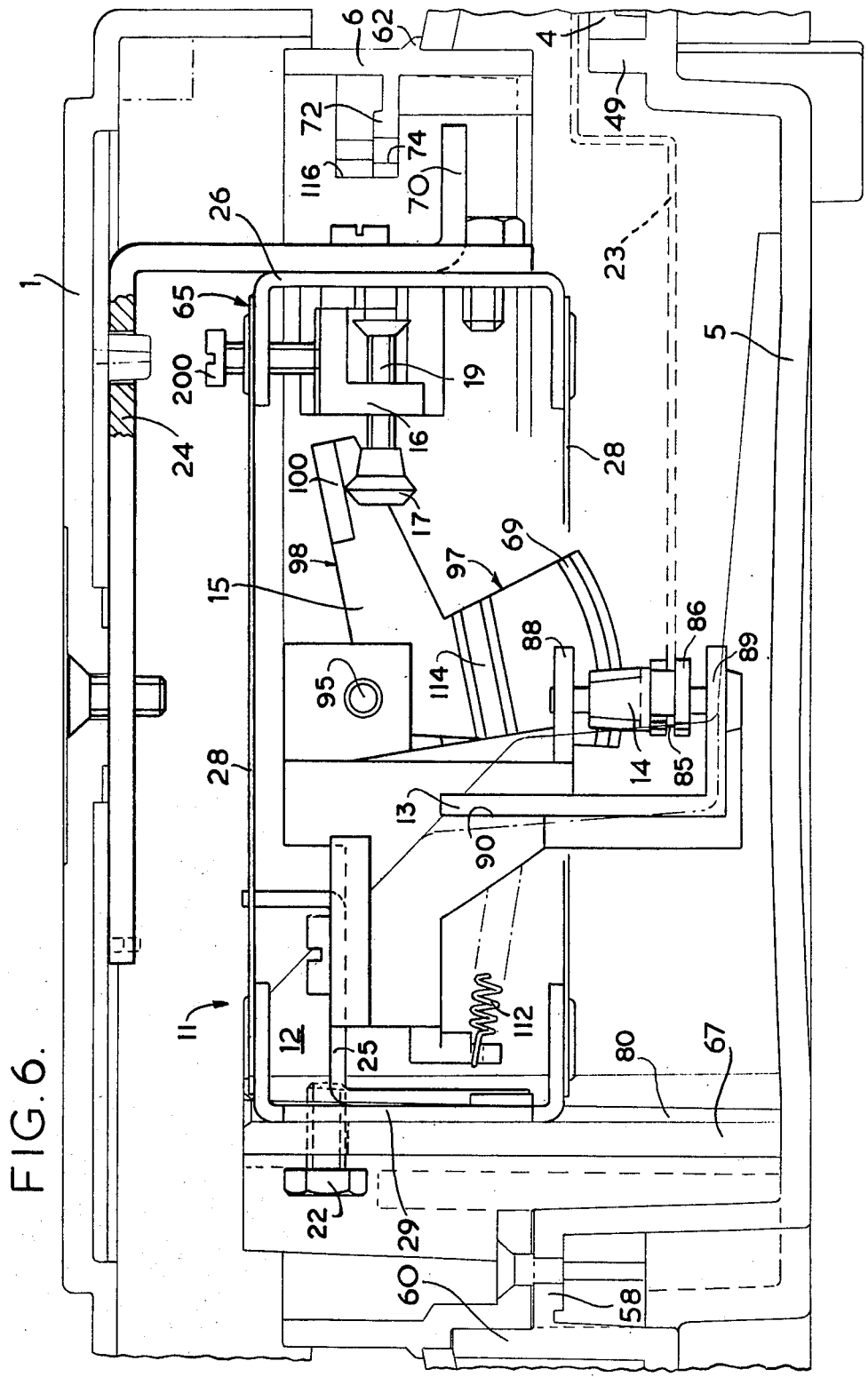
FIG. 6 is a side elevational view, on a larger scale, of the weighing mechanism accommodated within the body structure or casing of the weighing balance which is partially shown in outline.

A spring 112 serves to bias the lever member 15 to turn in a clockwise direction, as viewed in FIG. 6, and thereby ensures that abutting engagement is maintained between the arm 98 and screw 19. Thus, in operation, upon a load being applied to the weighing platform 1 causing the leaf spring unit to deflect so that the front frame member 26 moves vertically downwards in accordance with the magnitude of the load, the lever member 15 follows this movement, turning about its horizontal pivotal axis under the influence of the bias spring 112, and drives the pinion 14 through the sector gear teeth 69, thereby causing a corresponding deflection of the pointer 23 moving in a horizontal plane over the graduated scale of the scale carrier ring 4.

For fine control of the initial zero load position of the pointer 23, the top of the front frame member 26 carries a screw 200 directed vertically so as to bear upon the upper surface of the cantilever arm member 16. Adjustment of this screw 200 thus enables a controlled thrust pressure to be applied to the cantilever arm member 16 causing it to yield or flex resiliently, sufficiently to displace slightly its free end in a downwards direction, thereby moving the abutment screw 19 a corresponding distance downwards.

When assembled, the relative positioning of the lever member 15 and pinion 14 is such that the sector gear arm 97 is slightly stressed so that it flexes laterally to apply a light resilient biasing pressure effective to maintain close meshing engagement of the gear teeth. This lateral flexing is permitted or promoted by a transverse groove formation 114 in the sector gear arm 97.

It will be seen that the main body of the mounting block 12 is carried by an angle bracket 25 which is rigidly secured to the rear frame member 29. This angle bracket 25 is composed of metal and can be deformed slightly by bending which enables the precise position of the block 12 to be adjusted during assembly. This can be useful for fine adjustment of the pinion 14 and pivotal axis of the pointer 23 to establish a truly concentric relationship with the graduated scale on the scale carrier ring 4.

The weighing mechanism construction described is well adapted to provide a large angular range of deflection of the pointer 23, of the order of 180° or more if need be, with a high degree of linearity. Also, by avoiding use of more conventional rack and pinion drive means, there is a useful reduction in the number of friction points in the mechanism, and other features give various other practical advantages especially from an assembly and production aspect.

In this embodiment, the front frame member 24 is formed with a short forwardly protruding arm 70 which can co-operate with a screw 74 fitted in a hole 116 of an overhanging integral lug formation 72 of the bars 6 of the complete balance, thereby to provide an "up-stop" to limit upwards deflection of the leaf spring unit which could otherwise result in damage to the mechanism if for example the balance is lifted by means of grasping the weighing platform 1, thereby reducing risk of damage to the weighing mechanism.

The outer peripheral portion of the base frame 5 includes a short cylindrical depending skirt portion 76 formed with finger grip apertures 77, 77, at two diametrically opposed positions. The skirt portion 76 also has three circumferentially spaced depending lugs 78 fitted with rubber feet 8 for stable support of the balance on an underlying supporting surface.

Figure 9:
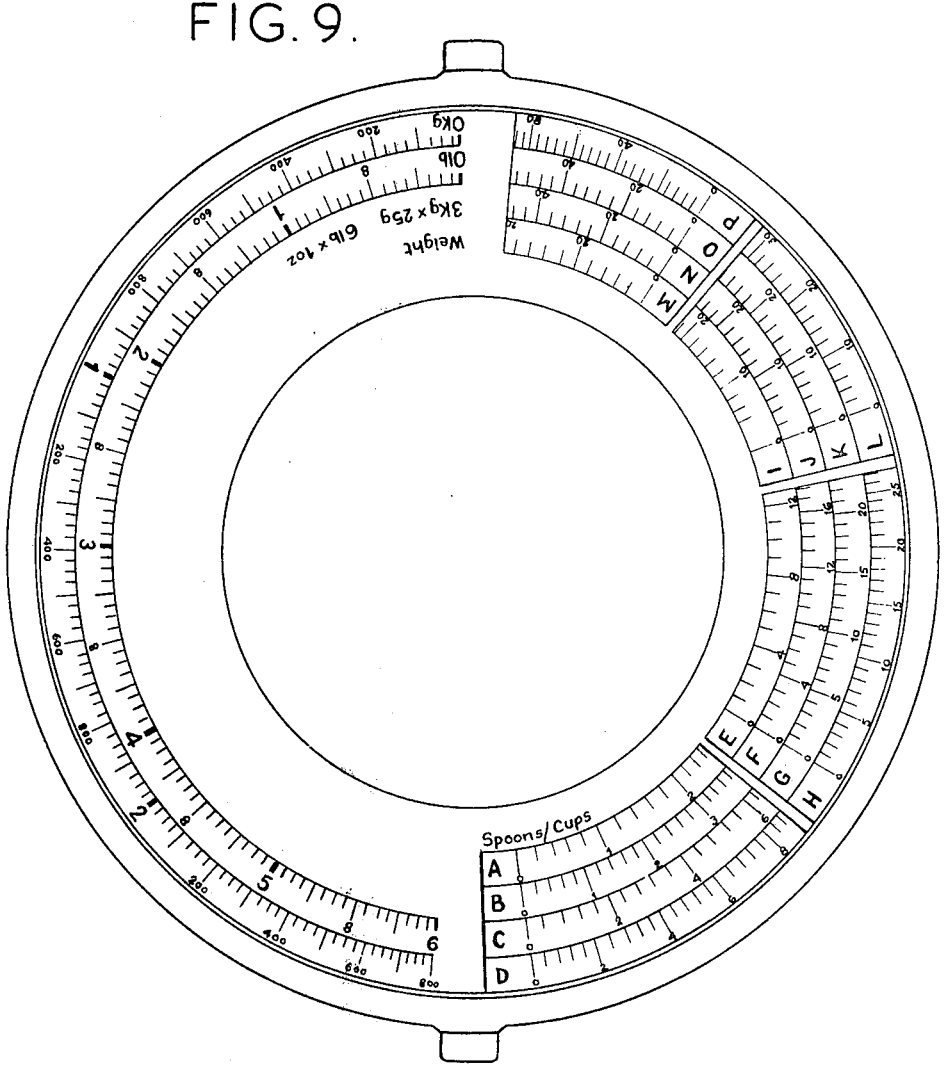
FIG. 9 is a plan view, similar to FIG. 4, of an alternative form of dial face with scales calibrated in "standard volume" weight equivalent units.

It will, of course, be understood that, within the scope of the invention as defined in the appended claims, many variations and modifications can be made, if desired, in many specific detail features of the embodiment herein described by way of example, both in the particular form, arrangement and number of the graduated scales provided, and in the physical structure. Thus, for example, obviously the graduated scales could, if desired, all be marked directly upon the transparent window cover member 2 which could itself be mounted for rotatable adjustment so as thereby also to constitute the scale carrier member, the pointer being re-profiled if necessary to ensure a close co-acting relationship with said graduated scales on the cover member. As shown in FIG. 9, graduated scales of the dial face on the rotatable scale carrier can be calibrated in standard "cups" or "spoons", representing standard volume units for different groups of foodstuffs, with the same associated advantageous structure and arrangement as with the "calorie" scales.

What I claim is:

1. In a spring balance, a weighing mechanism comprising:
   (a) a parallel motion leaf spring unit which deflects vertically under load,
   (b) a movable weight indicating member connected to a gear portion rotatably mounted to turn about a vertical axis,
   (c) lever means for controlling angular deflection in a horizontal plane of said weight indicating member,
   (d) said lever means being mounted for angular movement in a vertical plane,
   (e) said lever means including integral gear teeth which mesh directly with said pinion in order to transmit drive to the weight indicating member.

2. A spring balance weighing mechanism according to claim 1 wherein
   stop means is effective to provide an "up-stop" to limit upward vertical deflection of the leaf spring unit above its rest position.

3. A spring balance weighing mechanism according to claim 1 wherein
   the leaf spring unit comprises a pair of parallel spaced-apart leaf springs extending horizontally, one above the other, between interconnecting front and rear frame members,
   the rear frame member being rigidly mounted upon a fixed pillar support, and
   the front frame member being adapted to support the applied load so as to move vertically up and down as the leaf springs flex in response to said load,
   wherein an axially adjustable elongate screw threaded abutment element is carried by a cantilever arm fixed to the front frame member and extends substantially horizontally in the vertical plane of movement of the intermediate lever member so as to abut against the operating arm of the latter,
   said screw threaded abutment element thereby establishing the operative interengagement between the leaf spring unit and lever member and also forming a "range" adjustment means.

4. A spring balance weighing mechanism according to claim 3 wherein
   the front frame member carries "zero" adjustment means comprising an axially adjustable zeroing screw element which is directed vertically and arranged to thrust against said cantilever arm to cause resilient flexing and displacement of said cantilever arm up or down according to the setting of this zeroing screw element.

5. A spring balance weighing mechanism according to claim 1 wherein
   said lever means is a lever member of bell crank from and has a pair of arms extending substantially at right angles to one another,
   one arm constitutes a sector gear providing said gear teeth of contrate bevel type which mesh with the pinion.

6. A spring balance weighing mechanism according to claim 5 wherein
   the lever member and the gear pinion are mounted and arranged so that their mutually perpendicular rotational axes lie in intersecting relationship.

7. A spring balance weighing mechanism according to claim 5 wherein
   the sector gear arm of the lever member is transversely recessed in one face to promote slight lateral flexing effective, in the assembled mechanism, to apply a light resilient biasing force maintaining the gear teeth closely in mesh with the pinion.

8. A spring balance weighing mechanism according to claim 1 wherein
   said lever means is pivotally mounted upon a fixed mounting block which also supports top and bottom bearing mountings for the pinion and weighing indicating member.

9. A spring weighing mechanism according to claim 8 wherein
   said bottom bearing mounting is provided by a detachable part which clips into place in the mounting block.

10. A spring balance weighing mechanism according to claim 9 wherein
    said mounting block is carried by a bracket arm secured to a fixed support,
    said bracket arm being deformable under hand pressure whereby it can be bent in a final assembly stage to enable fine positional adjustment of said mounting block or body to provide precise centering of the pivotal axis of the pinion and weight indicating member.

* * * * *